J. H. IRWIN.
Reaper.

No. 29,698.

Patented Aug. 21, 1860.

Witnesses:
J. W. Coombs.
R. S. Spencer.

Inventor:
John H. Irwin.
per Munn & Co.
Attorneys.

UNITED STATES PATENT OFFICE.

JOHN H. IRWIN, OF BEARDSTOWN, ILLINOIS.

IMPROVEMENT IN HARVESTERS.

Specification forming part of Letters Patent No. 29,698, dated August 21, 1860.

*To all whom it may concern:*

Be it known that I, JOHN H. IRWIN, of Beardstown, in the county of Cass and State of Illinois, have invented a new and useful Improvement in Grain and Grass Harvesters; and I do hereby declare that the following is a full, clear, and exact description of the same, reference being had to the annexed drawings, making a part of this specification, in which—

Figure 1:
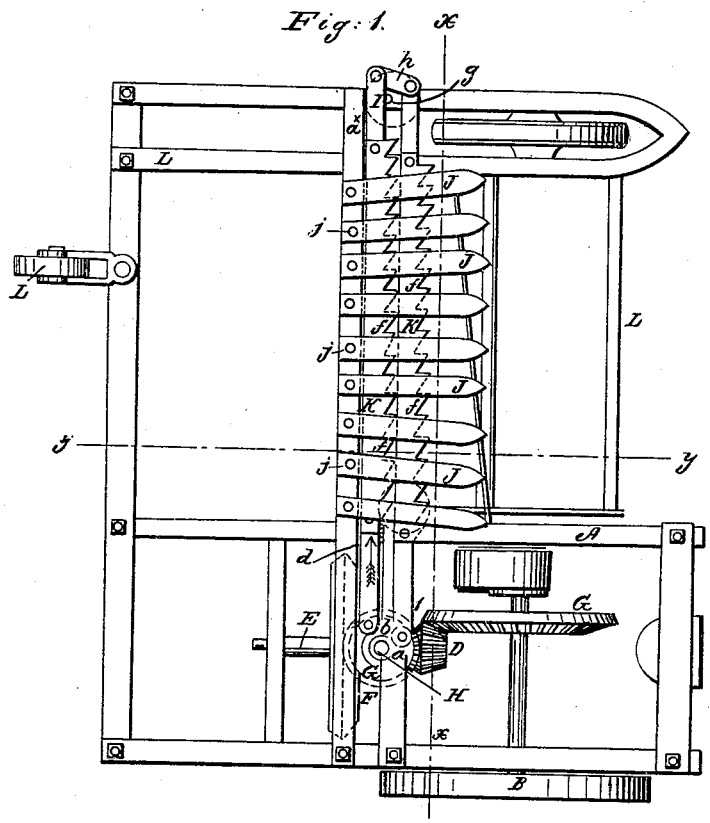
Figure 2:
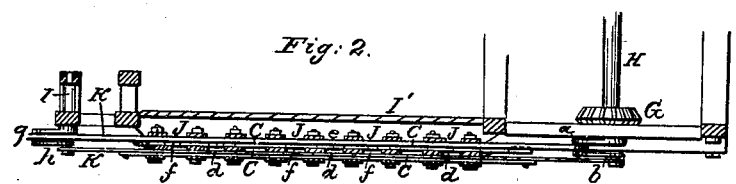
Figure 3:
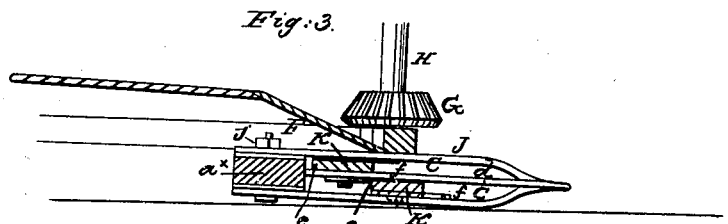

Figure 1 is an inverted plan of a harvester with my improvement applied it. Fig. 2 is a vertical section of the same, taken in the line $x\ x$, Fig. 1. Fig. 3 is a vertical section of the same, taken in the line $y\ y$, Fig. 1.

Similar letters of reference indicate corresponding parts in the several figures.

This invention relates to an improvement in the cutting devices of harvesters, substantially as hereinafter shown and described, whereby, it is believed, the sickle is made to work with a more even or regular movement than the ordinary reciprocating ones, with less wear and tear of the parts connected with it, and also to cut with a less expenditure of power without being so liable to choke or clog.

To enable those skilled in the art to fully understand and construct my invention, I will proceed to describe it.

A represents the main frame of a harvester; B, the driving-wheel, and C a toothed bevel-wheel placed on its axle. The wheel C gears into a bevel-pinion, D, which is placed on a longitudinal shaft, E, in the main frame, and which shaft also has a bevel-wheel, F, on it, the wheel F gearing into a pinion, G, which is placed in a vertical shaft, H, in the main frame, said shaft having two cranks, $a\ b$, at its lower end, one shaft being at right angles to the other, as shown more particularly in Fig. 2.

I is the platform-frame, which is attached to the main frame A at one side, as shown clearly in Fig. 1. The front bar, $a^*$, of platform I is the finger-bar.

J are the fingers, which may be constructed of two metal strips, $c$, and a central strip, $d$, connected at their front ends, the strips $c$ being curved at their front ends, so as to be brought in contact with the strips $d$, as shown clearly in Fig. 3.

To each crank $a\ b$ a sickle, K, is attached. These sickles are formed of a bar, $e$, having cutters $f$ attached, which cutters have one edge at right angles with their bars, the other edge forming obtuse angles with the same. The oblique edges of the cutters are their cutting-edges. The outer ends of the sickles K are attached to cranks $g\ h$, which are placed at right angles to each other at the lower end of a shaft, $i$, at the outer end of the platform-frame. The cranks $g\ h$ correspond in position to the cranks $a\ b$, and one sickle is fitted and works in the upper compartments or divisions of the fingers and the other in the lower divisions, as shown clearly in Figs. 2 and 3. The back parts of the fingers are attached to the bar $a^*$ by means of bolts $j$. The back part of the platform-frame is supported by a caster-wheel, L.

The operation is as follows: As the machine is drawn along the cranks $a\ b$ on shaft H are rotated through the medium of the gearing C D F G. The sickles K K have a longitudinal or lateral and forward and backward movement given them, the cranks $g\ h$, to which the outer ends of the sickles K are attached, rotating simultaneously with $a\ b$ in consequence of the connection formed between them by the sickles, and insuring the proper working movement of the same. The sickles, in consequence of being attached to reverse cranks, move forward and perform their cutting strokes alternately, the sickles cutting while moving in the direction indicated by arrow 1. The sickles, when receding and moving in the direction indicated by arrow 2, pass underneath the front end of the platform I', as shown in Fig. 3. As the sickles operate each tooth moves in the path of a circle, as shown in blue in Fig. 1, the teeth cutting while passing around the forward parts of the circles. By this arrangement the sickles are not liable to choke or clog, their movement being unfavorable to such a contingency. The peculiar movement of the sickles also causes them to work evenly and regularly, there being no jarring movement nor concussions, as is the case with the ordinary reciprocating sickles. The sickles require less power to operate them than the ordinary sickles, and the gearing and driving parts, as well as the sickles themselves, are not subject to the wear and tear to which the ordinary sickles are subjected.

The harvester is supplied with the ordinary reel, L, driven from the axle of the driving-wheel by a suitable belt.

Having thus described my invention, what I claim as new, and desire to secure by Letters Patent, is—

The fingers J, in combination with the sickles K K' and the mechanism for operating them, arranged in the manner described, for the purpose set forth.

JOHN H. IRWIN.

Witnesses:
R. B. FULKS,
THOMAS EYRE.